United States Patent [19]

Coffindaffer et al.

[11] Patent Number: 4,800,026

[45] Date of Patent: Jan. 24, 1989

[54] CURABLE AMINE FUNCTIONAL SILICONE FOR FABRIC WRINKLE REDUCTION

[75] Inventors: Timothy W. Coffindaffer, Loveland; Louis F. Wong, Mason, both of Ohio

[73] Assignee: The Procter & Gamble Company, Cincinnati, Ohio

[21] Appl. No.: 136,586

[22] Filed: Dec. 22, 1987

Related U.S. Application Data

[63] Continuation-in-part of Ser. No. 64,954, Jun. 22, 1987, abandoned.

[51] Int. Cl.[4] .................... D06M 00/00; C08G 37/26

[52] U.S. Cl. .................................... 252/8.8; 528/27; 528/28; 528/38; 556/424; 556/425

[58] Field of Search ................. 528/38; 556/424, 425; 252/8.8

[56] References Cited

U.S. PATENT DOCUMENTS

| | | | |
|---|---|---|---|
| 3,549,590 | 12/1970 | Holdstock et al. | 260/46.5 |
| 3,576,779 | 4/1971 | Holdstock et al. | 260/29.2 |
| 4,419,391 | 12/1983 | Tanaka | 427/387 |
| 4,661,269 | 4/1987 | Trinh | 252/8.8 |

FOREIGN PATENT DOCUMENTS

| | | |
|---|---|---|
| 0058493 | 8/1982 | European Pat. Off. . |

*Primary Examiner*—John F. Niebling
*Assistant Examiner*—Isabelle Rudriguez
*Attorney, Agent, or Firm*—Leonard Williamson; Robert B. Aylor; Richard C. Witte

[57] ABSTRACT

This invention relates to fabric care compositions comprising curable amine functional silicones for wrinkle reduction.

23 Claims, No Drawings

CURABLE AMINE FUNCTIONAL SILICONE FOR FABRIC WRINKLE REDUCTION

CROSS-REFERENCE TO RELATED APPLICATION

This is a continuation-in-part of U.S. patent application Ser. No. 064,954, filed June 22, 1987 now abandoned.

FIELD OF THE INVENTION

This invention relates to fabric care compositions and to a method for treating fabrics in order to improve various properties of the fabric, in particular, wrinkle reduction.

BACKGROUND OF THE INVENTION

In the modern world the vast majority of clothing is made from woven fabrics, and the art of weaving is many centuries old. Indeed the invention of weaving is generally attributed to the Ancient Egyptians. Yarns were produced from natural cotton, wool, or linen fibers, and garments made from fabrics woven from these yarns often creased badly in wear and, when washed, required considerable time and effort with a smoothing iron to restore them to a pristine appearance.

With the increasing standard of living, there has been a demand from the housewife for a release from the labor involved in home laundering. At the same time the increased cost of labor has raised the expense of commercial laundering considerably. This has resulted in additional pressure being brought to bear on textile technologists to produce fabrics and garments that can be laundered in domestic washing equipment, are then ready to wear, and will keep a good appearance during wear.

Within the last half century, textile manufacturers have implemented two major improvements in wash-and-wear garments: (1) the use of crosslinking resins on cotton containing garments, and (2) the use of synthetics and synthetic blends. Although these two implementations have made major strides in reducing the wrinkling of a garment, consumers are still dissatisfied with the results and feel a need to iron.

The term "wrinkle reduction" as used herein means that a fabric has less wrinkles after a special cleaning operation than it would otherwise have after an ordinary cleaning operation.

It is, therefore, an object of the present invention to provide compositions which provide superior wrinkle reduction benefits to treated garments. This and other objects are obtained herein, and will be seen from the following disclosure.

SUMMARY OF THE INVENTION

This invention relates to fabric care compositions comprising a curable amine functional silicone (CAFS) agent for use in a fabric cleaning operation whereby an effective amount of said CAFS is deposited on said fabric for wrinkle reduction.

DETAILED DESCRIPTION OF THE INVENTION

This invention relates to curable amine functional silicone (CAFS) compositions for fabric wrinkle reduction. In another respect this invention relates to methods of using such curable amine functional silicone compositions in the care of fabrics for improved wrinkle reduction. Preferred compositions are aqueous liquids which can also include a fabric softener. Such compositions are usually added to either the wash or rinse water of a laundering operation. These preferred compositions are organic solvent or aqueous based, water-dispersible additives which contain from about 0.1% to about 80%, more preferably from about 0.1% to about 50% of the curable amine functional silicone. The additives are diluted in the wash or rinse.

It is important to differentiate the curable amine functional silicones and the noncurable amine functional silicones. The curable amine functional silicone molecules have the ability to react one with the other to yield a polymeric elastomer of a much higher molecular weight compared to the original molecule. Thus, "curing" often occurs when two CAFS molecules or polymers react, yielding a polymer of a higher molecular weight. [$\sim SiOH + \sim SiOH \rightarrow \sim SiOSi \sim + H_2O$]. This "cure" is defined herein as silicone-oxygen-silicone linkages. In other words, the cured CAFS is a $\sim$SiOSi$\sim$ polymer. The silicone-oxygen-silicone linkage cure is distinguished from polysiloxane bridging reactions between amino groups and carboxyl (or opoxy) groups as disclosed in EPA No. 058,493, Ona et al., published Aug. 25, 1982, (Bulletin 82/34).

Curable amine functional silicones are commercially available; e.g., Dow Corning Silicone 531 and Silicone 536, General Electric SF 1706, SWS Silicones Corp. SWS E-210 are commercially available curable amine functional silicones widely marketed for use in hard surface care, such as in auto polishes, where detergent resistance and increased protection are very important.

Unlike curable silicones, noncurable silicones do not have the ability to react with one another and thus maintain a near constant molecular weight. Canadian Pat. No. 1,102,511, Atkinson et al., issued June 9, 1981, incorporated herein by reference, discloses noncurable amine functional silicones in liquid fabric softener compositions for fabric feel benefits. It is important to note, however, that Atkinson et al. does not teach curable amine functional silicones (CAFS) in such compositions.

Surprisingly, the curable amine functional silicones plus a suitable carrier to deposit an effective amount of the CAFS on fabric are excellent for fabric wrinkle reduction. Accordingly, several fabric care compositions containing curable amine functional silicones are herein disclosed. Several methods of using curable amine functional silicones for wrinkle reduction fabric care are also disclosed.

The CAFS compositions of this invention are used with a suitable carrier. The term "carrier" as used herein means any suitable vehicle (liquid, solid or mechanical) that is used to deliver the CAFS and deposit it on the fabric. E.g., the CAFS can be incorporated into an aqueous based softener or detergent composition, an aqueous emulsion, a dry cleaning solution or it can be coated on a dryer-added coated sheet. It can be used in a bottled liquid spray. The preferred embodiments comprise: a liquid rinse water composition comprising the CAFS plus fabric softener.

In a preferred execution, about 0.1% to about 10% by weight of a curable amine functional silicone is mixed into a suitable commercially available laundry liquid fabric softener composition. The result is a fabric care composition that provides an improved wrinkle reduction benefit to the treated fabric.

In another execution, a similar amount is mixed into a suitable commerically available liquid detergent and/or softener composition (anionic/nonionic surfactant based detergent, e.g., Liquid TIDE, or a nonionic surfactant based detergent, e.g., $BOLD_3$ Liquid). Care must be taken to use CAFS emulsifiers compatible to the detergent surfactants to avoid deemulsification of the CAFS. The new liquid detergent/CAFS product provides an unexpected wrinkle reduction benefit. Yet another execution is when a similar amount of CAFS is added to a suitable dry cleaning composition. Here the new dry cleaning product provides an improved wrinkle reduction benefit. Still another execution is when the CAFS is coated on a suitable water-permeable, but water-insoluble substrate for an automatic dryer, wash or rinse wash use. Suitable levels of CAFS for such coatings can range from about 0.01% to about 40%, preferably from about 5% to about 25%, by weight of the coating composition. In this execution care must be taken to prevent premature curing of the CAFS. Examples of suitable substrates are disclosed in U.S. Pat. Nos. 4,103,047, Zaki and Murphy, issued July 25, 1978; 4,237,155, issued Kardouche, Dec. 2, 1980; and 3,632,396, Zamora, issued Jan. 4, 1972, all of which are incorporated herein by reference. In yet another execution, the CAFS can be sprayed directly on moistened fabric. In the wash, rinse or dry cleaning liquid, the level of CAFS should be about 1-300 ppm, preferably 5-150 ppm. In a direct spray on application, the CAFS level could be higher, e.g., 1,000 ppm to 200,000 ppm.

Preferably, care should be taken to insure that the compositions of the present invention are essentially free of heavy waxes, abrasives, fiberglass, and other fabric incompatibles.

Curable Amine Functional Silicone (CAFS)

Curable amine functional silicones can be prepared by known methods. U.S. Pat. Nos. 3,355,424, Brown, issued Nov. 28, 1967, and 3,844,992, Antonen, issued Oct. 29, 1974, both incorporated herein by reference, disclose methods of making curable amine functional silicones.

Useful amino functional dialkylpolysiloxanes and methods for preparing them are described in U.S. Pat. Nos. 3,980,269, 3,960,575 and 4,247,330, whose pertinent disclosures are incorporated herein by reference.

The curable amine functional silicones of the present invention are preferably essentially free of silicone polyether copolymers disclosed in U.S. Pat. No. 4,246,423, Martin, issued Jan. 20, 1981.

The terms "amine functional silicone" and "aminoalkylsiloxane" are synonymous and are used interchangeably in the literature. The term "amine" as used herein means any suitable amine, and particularly cycloamine, polyamine and alkylamine, which include the curable alkylmonoanine, alkyldiamine and alkyltriamine functional silicones. The term "silicone" as used herein means a curable amine functional silicone, unless otherwise specified.

The preferred CAFS used in the present invention has an initial (before curing) average molecular weight of from at least about 1,000 up to about 100,000, preferably from about 1,000 to about 15,000, and more preferably from about 1,500 to about 5,000. While not being bound to any theory, it is theorized that the lower molecular weight CAFS compounds of this invention are best because they can penetrate more easily into the yarns of the fabric. The lower molecular weight CAFS is preferred, notwithstanding its expense and difficulty in preparation and/or stabilization.

The preferred CAFS of this invention when air dried cures to a higher molecular weight (MW) polymer. The CAFS of this invention can be either branched or straight chained, or mixtures thereof.

The preferred CAFS of this invention has the following formula:

$$((RO)R'_2\,SiO_{1/2})_X(R'_2\,SiO_{2/2})_Y(R''\,SiO_{3/2})_Z$$

wherein

X is equal to Z+2;

Y is at least 3, preferably 10 to 35, and is equal to or greater than 3Z;

for a linear CAFS Z is zero;

for a branched CAFS Z is at least one;

R is a hydrogen or a $C_{1-20}$ alkyl; and

R', R'' is a $C_{1-20}$ alkyl or an amine group;

wherein at least one of R' or R'' is an amine group.

In the more preferred CAFS, R is a hydrogen or a $C_{1-3}$ alkyl; R' is $C_{1-3}$ alkyl; and R'' is an alkylamine group having from about 2 to about 7 carbon atoms in its alkyl chain.

The value of Y and Z are dictated by the molecular weight of the CAFS. The value of Y is preferably 10 to 35 and the value of Z is preferably 1 to 3.

In the nomenclature "$SiO_{1/2}$" means the ratio of oxygen atoms to silicone atoms, i.e., $SiO_{1/2}$ means one oxygen atom is shared between two silicone atoms.

Preferred curable amine functional silicone agents are in the form of aqueous emulsions containing from about 10% to about 50% CAFS and from about 3% to about 15% of a suitable emulsifier.

General Electric Company's SF 1706 neat silicone (CAFS) fluid is a curable polymer that contains amine functional and dimethyl polysiloxane units.

Typical product data for SF 1706 silicone fluid is:

| Property | Value |
|---|---|
| CAFS content | 100% |
| Viscosity, cstks 25° C. | 15-40 |
| Specific gravity at 25° C. | 0.986 |
| Flash point, closed cup °C. | 66 |
| Amine equivalent (milli-equivalents of base/gm) | 0.5 |
| Diluents | Soluble in most aromatic and chlorinated hydrocarbons |

SF 1706 can be diluted to a concentration of from about 0.1% to about 80% and carried to fabrics via a suitable vehicle, e.g., a laundry wash liquor, a rinse liquor, a dry cleaning fluid, a flexible substrate, a spray bottle, and the like.

A particularly preferred CAFS has the following formula:

$$((RO)R'_2\,SiO_{1/2})_X(R'_2\,SiO_{2/2})_Y(R''\,SiO_{3/2})_Z$$

wherein R is methyl; R' is methyl; and R'' is $(CH_2)_3NH(CH_2)_2NH_2$ X is about 3.5; Y is about 27; and Z is about 1.5. The average molecular weight of such a curable amine functional silicone is about 2,500, but can range from about 1,800 to about 2,800. Other useful CAFS materials are disclosed in U.S. Pat. Nos. 4,665,116, Kornhaber et al., issued May 12, 1987 and 4,477,524, Brown et al., issued Oct. 16, 1984.

The fabric care composition of this invention comprises a suitable curable amine function silicone, and, preferably, another fabric care material, e.g., one selected from organic solvents, water, surfactants, fabric softeners, soil release agents, builders, brighteners, perfumes, dyes, and mixtures thereof.

One embodiment of the present invention is a liquid fabric softener composition comprising an effective amount of a CAFS and a fabric softener selected from the softeners disclosed in U.S. Pat. No. 4,661,269, Trinh et al., issued Apr. 28, 1987, incorporated herein by reference. U.S. Pat. No. 3,904,533, Neiditch et al., issued Sept 9, 1975, incorporated herein by reference, teaches a number of other fabric conditioning formulations suitable for the present invention.

Another embodiment of the present invention is a liquid detergent composition comprising an effective amount of CAFS and a surfactant, e.g., one selected from those disclosed in U.S. Pat. No. 4,318,818, Letton et al., issued Mar. 9, 1982, incorporated herein by reference. In preferred executions, the addition of from about 0.1% to about 33%, preferably from about 0.5% to about 20%, and, more preferably from about 1.0% to about 10% of the curable amine functional silicone by weight of the total liquid detergent composition can result in a product that provides outstanding wrinkle reduction benefits when fabric is washed therein in the usual manner.

Yet another embodiment of the present invention is a dryeradded flexible sheet comprising an effective amount of CAFS, wherein the sheet includes a fabric softener such as those disclosed in commonly assigned U.S. patent application Ser. No. 022,615, Evans et al., filed Mar. 3, 1987, incorporated herein by reference. In this embodiment the CAFS should be selected and incorporated into a suitable carrier such that it does not cure until distributed on wet fabrics in the dryer. Curing of the CAFS can be delayed by insuring that an excess of water, alcohol, or polyol is mixed with the CAFS, thus inhibiting ~SiOH functionalities from reacting with one another eliminating water to cure. Curing may also be delayed by using bulky "OR" groups (such as bulky alkoxides, bulky phenoxides, chelating alkoxides, etc.) on this ~SiOR functionality in order to slow the reaction of $H_2O$ with ~SiOR to form ~SiOH.

Still another embodiment of the present invention is an organic dry cleaning solvent containing an effective amount of CAFS. U.S. Pat. No. 4,135,879, Hasenclever, issued Jan. 23, 1979, incorporated herein by reference, discloses dry cleaning compositions and processes in which the CAFS of this invention can be added. The presence of a suitable amount of excess water or alcohol is desirable to prevent premature polymerization of the CAFS.

Some Preferred Embodiments

The preferred composition of this invention is an aqueous dispersion comprising: a curable amine functional silicone (CAFS) wherein the CAFS to fabric softener has a weight ratio of from about 17:1 to about 1:350, preferably from about 10:1 to about 1:100. Some more preferred weight ratios of CAFS to fabric softener are from 1:1 to 1:10 and from 1:5 to 1:10. These compositions are added to the rinse water for wrinkle reduction and fabric softening benefits.

Suitable fabric softener(s) are selected from the group consisting of:

i. quaternary ammonium compound;

ii. fatty amine fabric softening compound;

iii. fatty amine compound;

iv. mixtures thereof.

In certain liquid rinse-added compositions of this invention the amount of fabric softener can range from about 2% to about 35%, preferably from about 4% to about 27%, by weight of the total composition. The lower limits are amounts needed to contribute effective fabric softening performance when added to laundry rinse baths in the manner which is customary in home laundry practice. The higher limits are suitable for more concentrated liquid products which require smaller volume usage.

The preferred levels of CAFS in such composition can range from about 0.05% to about 40%; from about 0.1% to about 20%; and from about 0.5% to about 10% by weight of the concentrate.

Suitable fabric softener compounds include quaternary ammonium salts, as well as nonquaternary amines and amine salts.

Compositions containing cationic nitrogenous compounds in the form of quaternary ammonium salts and substituted imidazolinium salts having two long chain acyclic aliphatic hydrocarbon groups provide fabric softening benefits when used in laundry rinse operations. (See, for example, U.S. Pat. Nos. 3,644,203, Lamberti et al., issued Feb. 22, 1972; and 4,426,299, Verbruggen, issued Jan. 17, 1984; also "Cationic Surface Active Agents as Fabric Softeners," R. R. Egan, Journal of the American Oil Chemists' Society, January 1978, pages 118–121; and "How to Choose Cationics for Fabric Softeners," J. A. Ackerman, Journal of the American Oil Chemists' Society, June 1983, pp. 1166–1169).

Other suitable fabric softening compounds are the nonquaternary amides and the nonquaternary amines. A commonly cited material is the reaction product of higher fatty acids with hydroxy alkyl alkylene diamines. An example of these materials is the reaction product of higher fatty acids and hydroxyethylethylenediamine (See "Condensation Products from beta-hydroxyethylethylenediamine and Fatty Acids or Their Alkyl Esters and Their Application as Textile Softeners in Washing Agents," H. W. Eckert, Fette-Seifen-Anstrichmittel, September 1972, pages 527–533). These materials are usually cited generically along with other cationic quaternary ammonium salts and imidazolinium salts as softening actives in fabric softening compositions. (See U.S. Pat. Nos. 4,460,485, Rapisarda et al., issued July 17, 1984; 4,421,792, Rudy et al., issued Dec. 20, 1983; 4,327,133, Rudy et al., issued April 27, 1982).

A particularly preferred fabric softener is in the form of an aqueous dispersion comprising from about 3% to about 35% by weight of a mixture consisting of:

(a) from about 10% to about 92% of the reaction product of a higher fatty acid with a polyamine selected from the group consisting of hydroxyalkylalkylenediamines and dialkylenetriamines and mixtures thereof, and (b) from about 8% to about 90% of cationic nitrogenous salts having only one long chain acyclic aliphatic $C_{15}$–$C_{22}$ hydrocarbon group, and optionally (c) from 0% to about 80% of a cationic nitrogenous salt having two or more long chain acyclic aliphatic $C_{15}$–$C_{22}$ hydrocarbon groups or one said group and an arylalkyl group having from about 15 to about 22 carbon atoms in its alkyl chain.

For a detailed description of some preferred fabric softeners, see commonly assigned U.S. Pat. No. 4,661,269, Trinh/Wahl/Swartley/Hemingway, issued Apr. 28, 1987, incorporated herein by reference in its entirety.

The terms herein, e.g., softener compound, in general, denotes both singular and plural unless otherwise specified.

Preferred carriers are liquids selected from the group consisting of water and mixtures of the water and short chain $C_1$–$C_4$ monohydric alcohols. The water which is used can be distilled, deionized, or tap water. Mixtures of water and up to about 15% of a short chain alcohol such as ethanol, propanol, isopropanol or butanol, and mixtures thereof, are also useful as the carrier liquid.

Some short chain alcohols are present in commercially available quaternary ammonium compound products. Such products can be used in the preparation of preferred aqueous compositions of the present invention. The short chain alcohols are normally present in such products at a level of from from about 1% to about 10% by weight of the aqueous compositions.

Other carriers are suitable solids, polyol waxes and wax-like materials commonly used in the detergent and dryer-added softener fields and spray containers.

Some Optional Ingredients and Preferred Embodiments

Compatible adjuvants can be added to the compositions herein for their known purposes. Such adjuvants include, but are not limited to, viscosity control agents, perfumes, emulsifiers, preservatives, antioxidants, bactericides, fungicides, colorants, dyes, fluorescent dyes, brighteners, opacifiers, freeze-thaw control agents, shrinkage control agents, and agents to provide ease of ironing. These adjuvants, if used, are added at their usual levels, generally each of up to about 5% by weight of the preferred liquid composition.

Viscosity control agents can be organic or inorganic in nature. Examples of organic viscosity modifiers are fatty acids and esters, fatty alcohols, and water-miscible sovlents such as short chain alcohols. Examples of inorganic viscosity control agents are water-soluble ionizable salts. A wide variety of ionizable salts can be used. Examples of suitable salts are the halides of the group IA and IIA metals of the Periodic Table of the Elements, e.g., calcium chloride, magnesium chloride, sodium chloride, potassium bromide, and lithium chloride. Calcium chloride is preferred. The ionizable salts are particularly useful during the process of mixing the ingredients to make the liquid compositions herein, and later to obtain the desired viscosity. The amount of ionizable salts used depends on the amount of active ingredients used in such compositions and can be adjusted according to the desires of the formulator. Typical levels of salts used to control the composition viscosity are from about 20 to about 6,000 parts per million (ppm), preferably from about 20 to about 4,000 ppm by weight of the composition.

Typical levels of compatible bactericides used in the present compositions are from about 1 to about 1,500 ppm by weight of the composition.

Examples of antioxidants that can be added to the compositions of this invention are propyl gallate, available from Eastman Chemical Products, Inc., under the trade names Tenox® PG and Tenox S-1, and butylated hydroxy toluene, available from UOP Process Division under the trade name Sustane® BHT.

The compositions may contain noncurable silicones to provide additional benefits such as ease of ironing and improved fabric feel. The preferred adjunct silicones are polydimethylsiloxanes of viscosity of from about 100 centistokes (cs) to about 100,000 cs, preferably from about 200 cs to about 60,000 cs. These adjunct silicones can be used as is, or can be conveniently added to the softener compositions in a preemulsified form which is obtainable directly from suppliers. Examples of these preemulsified silicones are 60% emulsion of polydimethylsiloxane (350 cs) sold by Dow Corning Corporation under the trade name DOW CORNING® 1157 Fluid and 50% emulsion of polydimethylsiloxane (10,000 cs) sold by General Electric Company under the trade name General Electric® SM 2140 Silicones. The optional silicone component can be used in an amount of from about 0.1% to about 6% by weight of the composition.

A preferred composition contains from about 1 ppm to about 1,000 ppm of bactericide and from about 0.2% to about 2% of perfume, from 0% to about 3% of polydimethylsiloxane, from 0% to about 0.4% of calcium chloride, from about 10 ppm to about 100 ppm of dye, and from 0% to about 10% of short chain alcohols, by weight of the total composition.

The pH of the preferred compositions of this invention is generally adjusted to be in the range of from about 2 to about 11, preferably from about 3 to about 8. Adjustment of pH is normally carried out by including a small quantity of free acid or free base in the formulation. Any acidic material can be used; its selection can be made by anyone skilled in the softener arts on the basis of cost, availability, safety, etc. Any suitable acid can be used to adjust pH. Preferred are hydrochloric, sulfuric, phosphoric and formic acid. Similarly, any suitable base, e.g., sodium hydroxide, can also be used to adjust pH. For the purposes of this invention, pH is measured by a glass electrode in full strength softening composition in comparison with a standard calomel reference electrode.

The compositions of the present invention can be prepared by a number of methods. Some convenient and satisfactory methods are disclosed in the following nonlimiting examples.

EXAMPLE I

Procedure A

In a preferred procedure, 4.33 parts di(hydrogenated tallow)dimethylammonium chloride (DTDMAC), 1.00 part methyl-1-tallow amidoethyl-2-tallowimidazolinium methysulfate and 0.025 parts dye are weighed into a premix vessel.

After heating to 75° C. and mixing, the premix is added, with agitation, to a mix vessel (44° C.) containing 88.14 parts distilled water and 0.025 parts antioxidant solution. Then 0.45 parts of perfume is added to this "main" mix. The main mix is then cooled to 21° C., to which is added with stirring 5.0 parts emulsified curable amine functional silicone (20% silicone).

Procedure B

Same as Procedure A, except that the emulsified curable amine functional silicone is incorporated into the main mix prior to cooling of the mix to 21° C.

Procedure C

The neat curable amine functional silicone fluid can also be added to the composition via the premix.

4.33 parts DTDMAC (65° C.), 1.00 part methyl-1-tallow amidoethyl-2-tallow imidazolinium methylsulfate (23° C.), and 1.0 part curable amine functional silicone are weighed into a premix vessel.

After heating to 75° C. and mixing, the premix is added, with agitation, to a mix vessel (44° C.) containing 92.14 parts distilled water and 0.025 parts dye and 0.025 parts antioxidant solution. After the premix transfer, 0.45 parts perfume is then added to the main mix.

The ingredients for Procedures A, B and C are again set out in Table 1.

TABLE 1

| Ingredient | A & B Wt. % | C Wt. % |
|---|---|---|
| DTDMAC[1] | 4.33 | 4.33 |
| Methyl-1-tallowamidoethyl-2-tallowimidazolinium methylsulfate | 1.00 | 1.00 |
| Alcohol (from actives) | 0.80 | 0.80 |
| Perfume | 0.45 | 0.45 |
| Dye solution | 0.025 | 0.025 |
| Emulsified curable amine functional silicone (124-7300)[2] | 5.00 | — |
| Neat curable amine functional silicone fluid[3] | — | 1.00 |
| Antioxidant[4] | 0.025 | 0.025 |
| Distilled Water | 88.37 | 92.37 |

[1]Di(hydrogenated tallow)dimethyl ammonium chloride
[2]A specialty aqueous emulsion 124-7300 is made by General Electric Company. It contains 20% SF 1706 and about 5% of a mixture of octylphenoxypolyethoxyethanol and alkylphenylpoly(oxyethylene)glycol emulsifiers.
[3]SF 1706 is a curable amine functional silicone (MW about 2500) - General Electric Co.
[4]Tenox S-1 supplied by Eastman Kodak

EXAMPLE II

A CAFS and fabric softener composition is prepared using Procedure A. The ingredients are: 2.00 part Mazamide 6, 0.80 parts methyl-1-tallow amidoethyl-2-tallow imidazolinium methylsulfate (MTTMAC), 4.03 parts DTDMAC, 1.00 parts imidazolinium salt, 0.42 parts dye, 1.28 parts alcohol (from actives), 10.00 parts 20% emulsified curable amine functional silicone, and 80.44 parts distilled water. See Table 2 and Example I for a recap of the ingredients and method of preparation.

EXAMPLE III

Another CAFS/fabric softener composition is prepared using Procedure C. The ingredients for this example are: 2.00 parts Mazamide 6; 0.80 parts MTTMAC, 4.03 parts DTDMAC, 1.00 parts imidazolinium salt, 0.5 parts curable amine functional silicone, 0.42 parts perfume, 0.025 parts dye, 1.28 parts alcohol (from actives) and 89.94 parts distilled water.

TABLE 2

| Ingredient | Example II Wt. % | Example III Wt. % |
|---|---|---|
| Mazamide 6[1] | 2.00 | 2.00 |
| MTTMAC[2] | 0.80 | 0.80 |
| DTDMAC[3] | 4.03 | 4.03 |
| Imidazolinium salt[4] | 1.00 | 1.00 |
| Perfume | 0.42 | 0.42 |
| Polar Brilliant Blue Dye | 0.025 | 0.025 |
| Alcohol (from actives) | 1.28 | 1.28 |
| Emulsified curable amine functional silicone (124-7300) | 10.00 | — |
| Curable amine functional silicone (SF 1706) | — | 0.5 |
| Distilled water | 80.44 | 89.94 |

The incorporation of CAFS into the exemplified fabric softener compositions improves the wrinkle reduction performance of the fabric softener compositions and works very well on laundered polyesters, cottons and cotton/polyester blends.

What is claimed is:

1. A liquid fabric care composition comprising: (1) a suitable curable amine functional silicone agent for wrinkle reduction, (2) an effective amount of a fabric softener, and (3) a suitable carrier to deposit an effective amount of said curable amine functional silicone on said fabric, and wherein said curable amine functional silicone curves to form silicone-oxygen-silicone linkages; and wherein said fabric softener is selected from the group consisting of:

i. a quaternary ammonium compounds;

ii. a fatty amine fabric softening compounds;

ii. a fatty amide compounds; and iv. mixtures thereof.

2. The fabric care composition of claim 1 wherein said agent is a concentrate which contains from about 0.05% to about 40% by weight of said curable amine functional silicone and wherein said concentrate can be diluted when used.

3. The fabric care composition of claim 2 wherein said concentrate is an aqueous liquid containing from about 0.1% to about 20% of said curable amine functional silicone and said carrier is primarily water.

4. The fabric care composition of claim 2 wherein said concentrate contains from about 0.5% to about 10% of said curable amine functional silicone.

5. The fabric care composition of claim 1 wherein:

(a) said curable amine functional silicone has an average molecular weight of from about 1,000 to about 100,000; and (b) said fabric softener is present at a level of from about 3% to about 35% by weight of the total composition; and wherein the curable amine functional silicone and the fabric softener have a weight ratio of from about 17:1 to about 1:350.

6. The composition of claim 5 wherein said weight ratio of silicone and fabric softener is from about 10:1 to about 1:100.

7. The composition of claim 5 wherein said weight ratio of silicone and fabric softener is from about 1:1 to about 1:10.

8. The composition of claim 5 wherein the weight ratio of silicone and fabric softener is from about 1:5 to about 1:10.

9. The fabric care composition of claim 1 wherein said curable amine functional silicone has an average molecular weight of from about 1,000 to about 100,000.

10. The fabric care composition of claim 1 wherein said silicone has an average molecular weight of from about 1,000 to about 15,000.

11. The fabric care composition of claim 1 wherein said silicone has an average molecular weight of from about 1,500 to about 5,000.

12. The fabric care composition of claim 1 wherein said curable amine functional silicone is selected from the group of linear and branch curable amine functional branch silicones and mixtures thereof having the following structure:

$$((RO)R'_2SiO_{1/2})_X(R'_2SiO_{2/2})_Y(R''SiO_{3/2})_Z;$$

wherein

X is equal to Z+2; and

Y is at least 3; and wherein

Z is zero for a linear curable amine functional silicone;

Z is at least one for a branched curable amine functional silicone;

wherein

R is a hydrogen or a $C_{1-20}$ alkyl; and

R', R'' is a $C_{1-20}$ alkyl or an amine group selected from cyclic amines, polyamines and alkylamines having from about 2 to about 7 carbon atoms in their alkyl chain, and wherein at least R' or R'' is an amine group.

13. The fabric care composition of claim 12 wherein

R is a hydrogen or a $C_{1-3}$ alkyl;

R' is $C_{1-3}$ alkyl; and

R'' is an alkylamine group having from about 2 to about 7 carbon atoms in its alkyl chain.

14. The composition of claim 13 wherein said R is methyl; R' is methyl and R'' is $(CH_2)_3NH(CH_2)_2NH_2$; and X is about 3.5; Y is about 27 and Z is about 1.5; and wherein said curable amine functional silicone has a molecular weight in the range of from about 1,000 to about 2,800 and a viscosity of about 5–40 centistokes at 25° C.

15. The composition of claim 1 wherein said fabric softener comprises amine compound.

16. The fabric care composition of claim 1 wherein said fabric softener comprises quaternary ammonium compound.

17. The composition of claim 1 wherein said fabric softener is fatty amide compound.

18. The composition of claim 1 wherein said fabric softener is a mixture of amide, amine and quaternary ammonium compounds.

19. A method of reducing wrinkles in treated fabrics comprising contacting said fabrics with an effective amount of water and the composition of claim 1 and drying said fabrics to cure said amine functional silicone on said fabrics.

20. The method of claim 19 wherein said carrier is an aqueous laundry solution; and wherein said curable amine functional silicone is present in said solution at a level of from about 1 ppm to about 300 ppm.

21. The method of claim 19 wherein said carrier is an aqueous laundry solution; and wherein said curable amine functional silicone is present in said solution at a level of from about 5 ppm to about 150 ppm.

22. The method of claim 20 wherein said aqueous laundry solution is a wash solution.

23. The method of claim 20 wherein said aqueous laundry solution is a rinse.

* * * * *

UNITED STATES PATENT AND TRADEMARK OFFICE
CERTIFICATE OF CORRECTION

PATENT NO. : 4,800,026

DATED : January 24, 1989

INVENTOR(S) : Timothy W. Coffindaffer and Louis F. Wong

It is certified that error appears in the above-identified patent and that said Letters Patent is hereby corrected as shown below:

Col. 9, line 65, insert the following footnotes for Table 2 --

[1] Reaction product of 2 moles of hydrogenated tallow fatty acid with 1 mole of N-2-hydroxyethylenediamine

[2] Mono(hydrogenated tallow)trimethyl ammonium chloride

[3] Di(hydrogenated tallow)dimethyl ammonium chloride

[4] Methyl-1-tallow amidoethyl-2-tallow imidazolinium methylsulfate --.

Col. 10, line 16, delete "ii." and insert -- iii. --.

Signed and Sealed this

Twenty-sixth Day of November, 1991

*Attest:*

HARRY F. MANBECK, JR.

*Attesting Officer*

*Commissioner of Patents and Trademarks*